United States Patent
Shintani et al.

(10) Patent No.: US 7,684,433 B2
(45) Date of Patent: Mar. 23, 2010

(54) METHOD AND APPARATUS FOR BI-DIRECTIONAL COMMUNICATION BETWEEN ANALOG AND DIGITAL DEVICES

(75) Inventors: Peter Shintani, San Diego, CA (US); Kenichiro Toyoshima, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1354 days.

(21) Appl. No.: 11/096,865

(22) Filed: Mar. 31, 2005

(65) Prior Publication Data

US 2006/0222022 A1    Oct. 5, 2006

(51) Int. Cl.
*H04L 12/66* (2006.01)
*H04N 7/173* (2006.01)
*H04N 7/16* (2006.01)

(52) U.S. Cl. .................. 370/463; 370/535; 725/131; 725/139; 725/151

(58) Field of Classification Search ............. 725/78–80, 725/131, 139, 151; 370/297, 307, 535–540, 370/463
See application file for complete search history.

(56) References Cited

U.S. PATENT DOCUMENTS

| | | | |
|---|---|---|---|
| 5,619,250 A | 4/1997 | McClellan et al. | |
| 5,623,304 A * | 4/1997 | Ota et al. | 348/143 |
| 6,192,399 B1 * | 2/2001 | Goodman | 725/78 |
| 6,199,206 B1 * | 3/2001 | Nishioka et al. | 725/51 |
| 6,317,885 B1 | 11/2001 | Fries | |
| 6,345,389 B1 | 2/2002 | Dureau | |
| 6,369,699 B1 * | 4/2002 | Liu | 340/538.11 |
| 6,381,748 B1 | 4/2002 | Lin et al. | |
| 6,542,585 B2 * | 4/2003 | Goodman | 379/93.01 |
| 6,742,188 B1 | 5/2004 | Del Castillo | |
| 7,145,990 B2 * | 12/2006 | Goodman | 379/90.01 |
| 7,325,033 B2 * | 1/2008 | Thornton | 709/204 |
| 7,471,648 B2 * | 12/2008 | Andersen et al. | 370/261 |
| 2004/0049781 A1 | 3/2004 | Flesh et al. | |
| 2004/0119848 A1 * | 6/2004 | Buehler | 348/239 |
| 2004/0189800 A1 | 9/2004 | Berkey et al. | |

* cited by examiner

*Primary Examiner*—Steven H Nguyen
(74) *Attorney, Agent, or Firm*—Fitch, Even, Tabin & Flannery

(57) ABSTRACT

A bi-directional communications interface includes a source multiplexer for connecting to a video source. The source multiplexer includes a source multiplexer input port for receiving an analog video signal from the video source, a source multiplexer output port for driving the video source with an upstream data signal, and a source multiplexer bi-directional port for coupling the analog video signal from the source multiplexer input port to the video cable and for coupling the upstream data signal from the video cable to the source multiplexer output port.

24 Claims, 6 Drawing Sheets

METHOD AND APPARATUS FOR BI-DIRECTIONAL COMMUNICATION BETWEEN ANALOG AND DIGITAL DEVICES

BACKGROUND OF THE INVENTION

1. Field of the Invention

The method and apparatus for bi-directional communication between analog and digital devices disclosed herein relates generally to communications interfaces between a display driver and a display device. More specifically, but without limitation thereto, the method and apparatus disclosed herein relates to a bi-directional communications interface between a set top box and a television monitor.

2. Description of Related Art

Three video interfaces commonly used between consumer display devices such as video monitors and display drivers are analog signal interfaces, compressed digital signal interfaces, and baseband digital signal interfaces. These interfaces are used to send video signals from a video source, such as a television set top box (STB), to a video sink, such as a television monitor or display (TV). In the compressed digital signal and baseband digital signal interfaces, there is some provision for upstream data communication from the video sink to the video source in addition to the downstream flow of video signals. In the analog signal interface, however, there is generally no mechanism to transmit upstream data from the video sink to the video source. One method used to transmit upstream data from the video sink to the video source is to connect an additional cable between the video sink and the video source.

SUMMARY OF THE INVENTION

In one aspect of the present invention, an apparatus includes:
- a source multiplexer for connecting to a video source wherein the source multiplexer comprises:
  - a source multiplexer input port for receiving an analog video signal from the video source;
  - a source multiplexer output port for driving the video source with an upstream data signal; and
  - a source multiplexer bi-directional port for coupling the analog video signal from the source multiplexer input port to the video cable and for coupling the upstream data signal from the video cable to the source multiplexer output port.

In a further aspect of the present invention, a method includes steps of:
- receiving an analog video signal from a video source connected to a source multiplexer input port of a source multiplexer;
- driving the video source at a source multiplexer output port of the source multiplexer with an upstream data signal from a video cable;
- coupling the analog video signal from the source multiplexer input port to the video cable through a source multiplexer bi-directional port of the source multiplexer; and
- coupling the upstream data signal from the video cable through the source multiplexer bi-directional port to the source multiplexer output port.

In another aspect of the present invention, an apparatus includes:
- a source multiplexer for connecting to a video source wherein the source multiplexer comprises:
  - a first source multiplexer input port for receiving an analog video signal from the video source;
  - a second source multiplexer input port for receiving a downstream data signal from the video source;
  - a source multiplexer output port for driving the video source with an upstream data signal from a video cable; and
  - a source multiplexer bi-directional port for coupling the analog video signal from the first source multiplexer input port to the video cable, for coupling the downstream data signal from the second source multiplexer input port to the video cable, and for coupling the upstream data signal from the video cable to the source multiplexer output port; and
- a sink multiplexer for connecting to a video sink wherein the sink multiplexer comprises:
  - a sink multiplexer input port for receiving the upstream data signal from the video sink;
  - a first sink multiplexer output port for driving the video sink with the analog video signal;
  - a second sink multiplexer output port for driving the video sink with the downstream data signal; and
  - a sink multiplexer bi-directional port for coupling the upstream data signal from the sink multiplexer input port to the video cable, for coupling the analog video signal from the video cable to the first sink multiplexer output port, and for coupling the downstream data signal from the video cable to the second sink multiplexer output port.

In a further aspect of the present invention, a method includes steps of:
- receiving an analog video signal from a video source connected to a first source multiplexer input port of a source multiplexer;
- receiving a downstream data signal from the video source connected to a second source multiplexer input port of the source multiplexer;
- driving the video source at a source multiplexer output port of the source multiplexer with an upstream data signal from a video cable;
- coupling the analog video signal from the first source multiplexer input port to the video cable through a source multiplexer bi-directional port of the source multiplexer;
- coupling the downstream data signal from the second source multiplexer input port to the video cable through the source multiplexer bi-directional port;
- coupling the upstream data signal from the video cable through the source multiplexer bi-directional port to the source multiplexer output port;
- receiving the upstream data signal from a sink multiplexer input port of a sink multiplexer connected to a video sink;
- driving the video sink at a first sink multiplexer output port of the sink multiplexer with the analog video signal from the video cable;
- driving the video sink at a second sink multiplexer output port of the sink multiplexer with the downstream data signal from the video cable;
- coupling the upstream data signal from the sink multiplexer input port to the video cable through a sink multiplexer bi-directional port of the sink multiplexer;
- coupling the analog video signal from the video cable through the sink demultiplexer bi-directional port to the first sink multiplexer output port; and coupling the downstream data signal from the video cable through the sink demultiplexer bi-directional port to the second sink multiplexer output port.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the following drawings.

The elements shown in the figures are illustrated for simplicity and clarity and have not necessarily been drawn to scale. For example, the dimensions of some elements in the figures may be exaggerated relative to other elements to point out distinctive features in the illustrated embodiments of the present invention described below.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order of occurrence, however, practitioners of the art will understand that the specific order is not a requirement. Also, the terms and expressions used in the description have the ordinary meanings accorded to such terms and expressions in the corresponding respective areas of inquiry and study except where other meanings have been specifically set forth herein.

Coaxial cable, that is, a single conductor surrounded by a coaxial shield, has been a traditional medium of choice for transmitting analog video signals from a video signal source, such as a television set top box (STB), to a video signal sink, such as a television monitor display.

Figure 1:
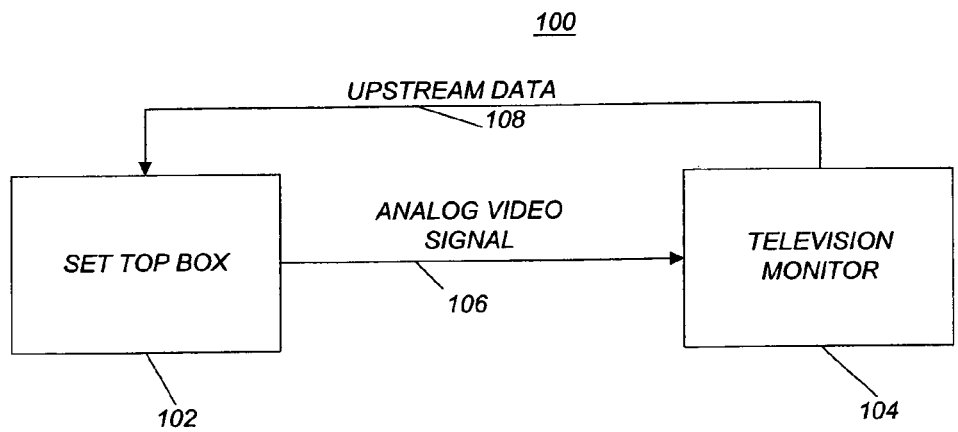
FIG. 1 illustrates a block diagram of an interface between a set top box and a television monitor of the prior art.

FIG. 1 illustrates a block diagram 100 of an interface between a set top box and a television monitor of the prior art. Shown in FIG. 1 are a set top box 102, a television monitor 104, an analog video cable 106, and an upstream data cable 108.

In FIG. 1, the set top box 102 is a video source that may generate a variety of analog video signals received from local television broadcast stations, television satellite networks, cable television networks, video game controllers, and other sources of video signals. The implementation of set top boxes is well known and is not critical to the embodiments of the bi-directional communications interface disclosed herein. The television monitor 104 is the portion of a typical television set that includes circuitry for displaying the analog video signal carried by the analog video cable 106. The television monitor 104 may also include additional circuitry for receiving user commands, for example, from an infrared remote control device. Status information for the television monitor 104, such as the type of display, the display resolution, and so on, may be transmitted to the set top box 102 through the upstream data cable 108.

A disadvantage of the arrangement of FIG. 1 is that the upstream data cable 108 is required in addition to the analog video cable to carry the upstream data to the set top box 102. Although the separate upstream data cable 108 avoids interference with the downstream analog video signal, there is an accompanying added cost, space, and reduced reliability incurred by the added cable. Accordingly, it is desirable to communicate the upstream data in the same cable that is used to carry the analog video signal.

The process of transmitting upstream data to the video source from the video sink through the video transmission medium to control the video source has been commonly referred to as "up-the-coax" (UTC) protocol. To avoid transmission errors, conventional UTC protocols provide redundant data transmission or a bi-directional handshake communication to acknowledge data transmissions. For example, a data block may be sent from the sink to the source during a vertical blanking interval of the video signal transmitted from the source to the sink, and an acknowledge (ACK) may be sent from the source to the sink in a subsequent vertical blanking interval. If the reply message indicates a negative acknowledge (NAK), then the data block is re-transmitted from the sink to the source in a subsequent vertical blanking interval. Previous up-the-coax protocols require time multiplexing the upstream data with the analog video signal during intervals such as the vertical blanking interval and the horizontal blanking interval when the video signal is not used for displaying data to avoid interfering with the analog video signal. A disadvantage of this solution is that upstream data may only be transmitted through the video cable during the fraction of the time that is not used by the analog video signal to display data, resulting in a low upstream data rate. Accordingly, it is desirable to transmit the upstream data through the video cable continuously without interfering with the analog video signal.

In one aspect of the present invention, an apparatus includes:

a source multiplexer for connecting to a video source wherein the source multiplexer comprises:

a source multiplexer input port for receiving an analog video signal from the video source;

a source multiplexer output port for driving the video source with an upstream data signal; and a source multiplexer bi-directional port for coupling the analog video signal from the source multiplexer input port to the video cable and for coupling the upstream data signal from the video cable to the source multiplexer output port.

Depending on the video format, there is a corresponding upper limit to the frequency spectrum used by the analog video signal. For example, in a standard definition video format of 720×480i, the nominal sampling rate is 13.5 MHz, which limits the video content to a maximum bandwidth of 6.75 MHz. Similarly, for 720×480p, the nominal sampling rate is 27 MHz, which limits the video content to a maximum bandwidth of 13.5 MHz, and for 1280×720p and 1920×1080i, the nominal sampling rate is 74.25 MHz, which limits the video content to a maximum bandwidth of 37.125 MHz. Accordingly, the unused portion of the frequency bandwidth capability of the coaxial cable may be used to communicate upstream digital signals in a way that does not interfere with the downstream analog signals.

Figure 2:
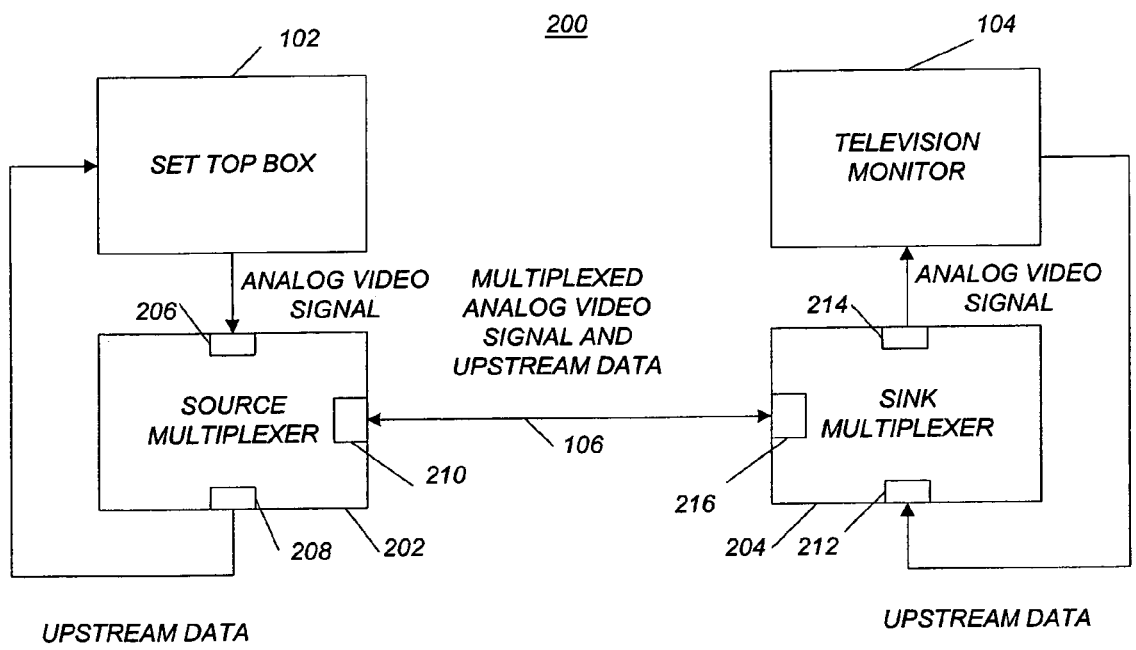
FIG. 2 illustrates a block diagram of an interface between a set top box and a television monitor in which the analog video signal and an upstream data signal are multiplexed in a video cable.

FIG. 2 illustrates a block diagram 200 of an interface between a set top box and a television monitor in which the analog video signal and an upstream data signal are multiplexed in a video cable. Shown in FIG. 2 are a set top box 102, a television monitor 104, an analog video cable 106, a source multiplexer 202, a sink multiplexer 204, a source multiplexer input port 206, a source multiplexer output port 208, a source multiplexer bi-directional port 210, a sink multiplexer input port 212, a sink multiplexer output port 214, and a sink multiplexer bi-directional port 216.

In FIG. 2, the video source is the set top box 102 and the video sink is the television monitor 104, however, other video sources that generate analog video signals and receive upstream data signals and other video sinks that receive analog video signals and generate upstream data signals may be used to practice various embodiments of the present invention within the scope of the appended claims.

The analog video signal and the upstream data signal are frequency multiplexed in the analog video cable 106 by the source multiplexer 202 and the sink multiplexer 204, that is, the analog video signal and the upstream data signal are separated in frequency so that they may be multiplexed and transmitted together through the analog cable 106 without loss of information when the analog video signal and the upstream data signal are de-multiplexed by suitable frequency band filters. The source multiplexer 202 includes the source multiplexer input port 206 for receiving the analog video signal generated by the set top box 102 and the source multiplexer output port 208 for driving the set top box with the upstream data signal. The source multiplexer bi-directional port 210 couples the analog video signal from the source multiplexer input port 206 to the analog video cable 106 and also couples the upstream data signal from the analog video cable 106 to the source multiplexer output port 208.

The sink multiplexer 204 includes the sink multiplexer input port 212 for receiving the upstream data signal generated by the television monitor 104 and the sink multiplexer output port 214 for driving the television monitor 104 with the analog video signal from the analog video cable 106. The sink multiplexer bi-directional port 216 couples the analog video signal from the analog video cable 106 to the sink multiplexer output port 214 and also couples the upstream data signal from the sink multiplexer input port 212 to the analog video cable 106. The upstream data signal may include, for example, status information about the television monitor 104 such as the type of display, the display resolution, user commands received by an infrared receiver in the television monitor 104 from a remote control device, and so on.

Figure 3:
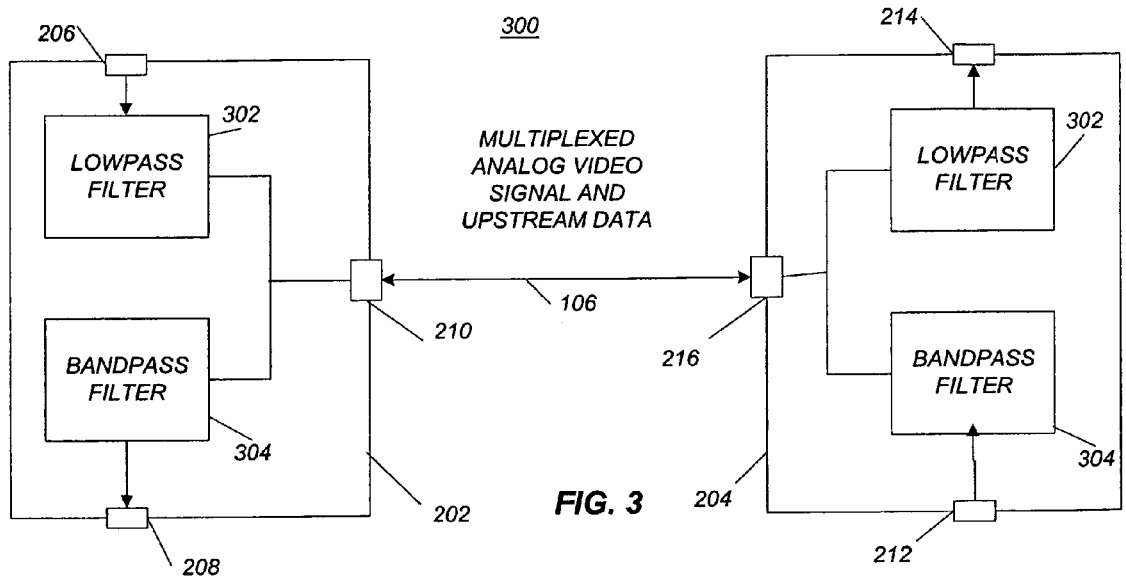
FIG. 3 illustrates a detailed block diagram of the bi-directional communications interface of FIG. 2.

FIG. 3 illustrates a detailed block diagram 300 of the bi-directional communications interface of FIG. 2. Shown in FIG. 3 are an analog video cable 106, a source multiplexer 202, a sink multiplexer 204, a source multiplexer input port 206, a source multiplexer output port 208, a source multiplexer bi-directional port 210, a sink multiplexer input port 212, a sink multiplexer output port 214, a sink multiplexer bi-directional port 216, lowpass filters 302, and bandpass filters 304.

In the example of FIG. 3, the source multiplexer 202 includes the lowpass filters 302 and the bandpass filters 304. The lowpass filters 302 may be constructed according to well known radio frequency filter design techniques and preferably have a cutoff frequency that is about equal to the upper frequency limit of the analog video signal. The lowpass filters 302 pass the analog video signal and block the upstream data signal at the source multiplexer input port 206 and the sink multiplexer output port 214. The bandpass filters 304 may also be constructed according to well known radio frequency filter design techniques. The bandpass filters 304 block the analog video signal and pass the upstream data signal at the source multiplexer output port 208 and the sink multiplexer input port 212.

Figure 4:
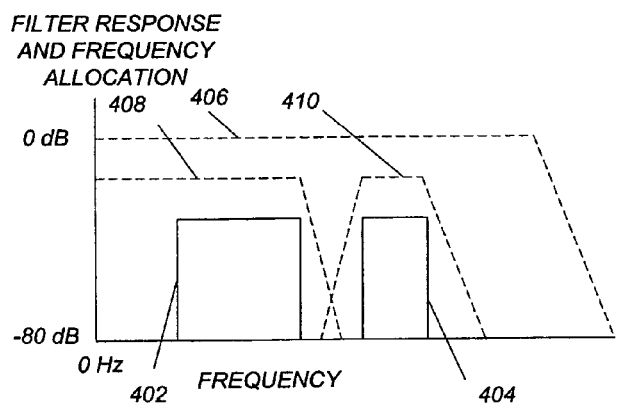
FIG. 4 illustrates a plot of filter response and frequency allocation vs. frequency for the bi-directional communications interface of FIG. 3.

FIG. 4 illustrates a plot 400 of filter response and frequency allocation vs. frequency for the bi-directional communications interface of FIG. 3. Shown in FIG. 4 are an analog video signal frequency band 402, an upstream data signal frequency band 404, an analog video cable response curve 406, a lowpass filter response curve 408, and a bandpass filter response curve 410.

In FIG. 4, the analog video signal frequency band 402 occupies less than the total available frequency bandwidth of the analog video cable illustrated by the analog video cable response curve 406. The unused frequency bandwidth of the analog video cable is therefore available for use by the upstream data signal.

The upstream data signal may be generated according to well known signal processing techniques in the upstream data signal frequency band 404 that lies outside the analog video signal frequency band 402 and within the usable frequency bandwidth of the analog video cable under the analog video cable response curve 406. For example, the upstream data signal may modulate a carrier frequency within the upstream data signal frequency band 404 according to well known modulation techniques such as frequency modulation, amplitude modulation, quadrature amplitude modulation, frequency shift keyed modulation, and so on.

Alternatively, the lowpass filters 302 and the bandpass filters 304 may be implemented as integrated filter combinations, also known as diplexers.

Figure 5:
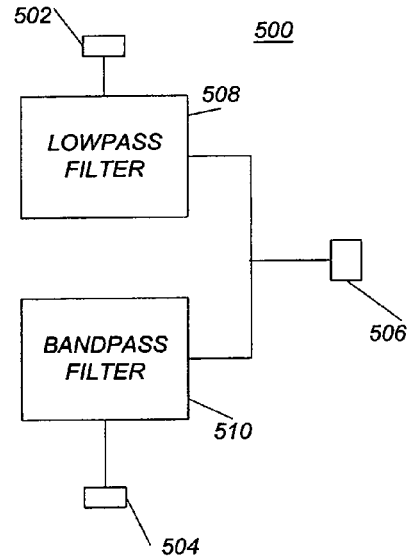
FIG. 5 illustrates a block diagram of a diplexer of the prior art.

FIG. 5 illustrates a block diagram 500 of a diplexer of the prior art. Shown in FIG. 5 are an input port 502, an output port 504, a bi-directional port 506, a lowpass filter 508, and a bandpass filter 510.

Diplexers are widely available from a variety of vendors and are typically used for coupling a transmitter and a receiver to a commonly shared radio frequency antenna. For example, a transmitter may be connected to the input port 502, a receiver may be connected to the output port 504, and the antenna may be connected to the bi-directional port 506.

Because the lowpass filter 508 and the bandpass filter 510 share a common port, that is, the bi-directional port 506, a combination of the lowpass filter 508 and the bandpass filter 510 may be designed that requires fewer components than would be required if each filter is constructed separately, thereby reducing the cost of the source multiplexer 202 and the sink multiplexer 204.

Other filter combinations besides lowpass/bandpass may be used to separate the frequency bands used by the analog video signal and the upstream data signal according to well known radio frequency filter design techniques. For example, the filter combination may be a bandpass/bandpass, a lowpass/highpass, or other filter combination having a common bi-directional port that is shared by all of the filters and a separate port for each filter that may be uni-directional or bi-directional, depending on the application. Also, a combination of more than two filters may be used, for example, to multiplex the analog video signal with an upstream data signal and a downstream data signal. Because the digital-to-analog converters (DAC) typically used to generate the upstream data signal and the downstream data signal frequently include a lowpass filter, the implementation of the diplexer filters may be simplified if the DAC filters are known and are of sufficient quality.

Figure 6:
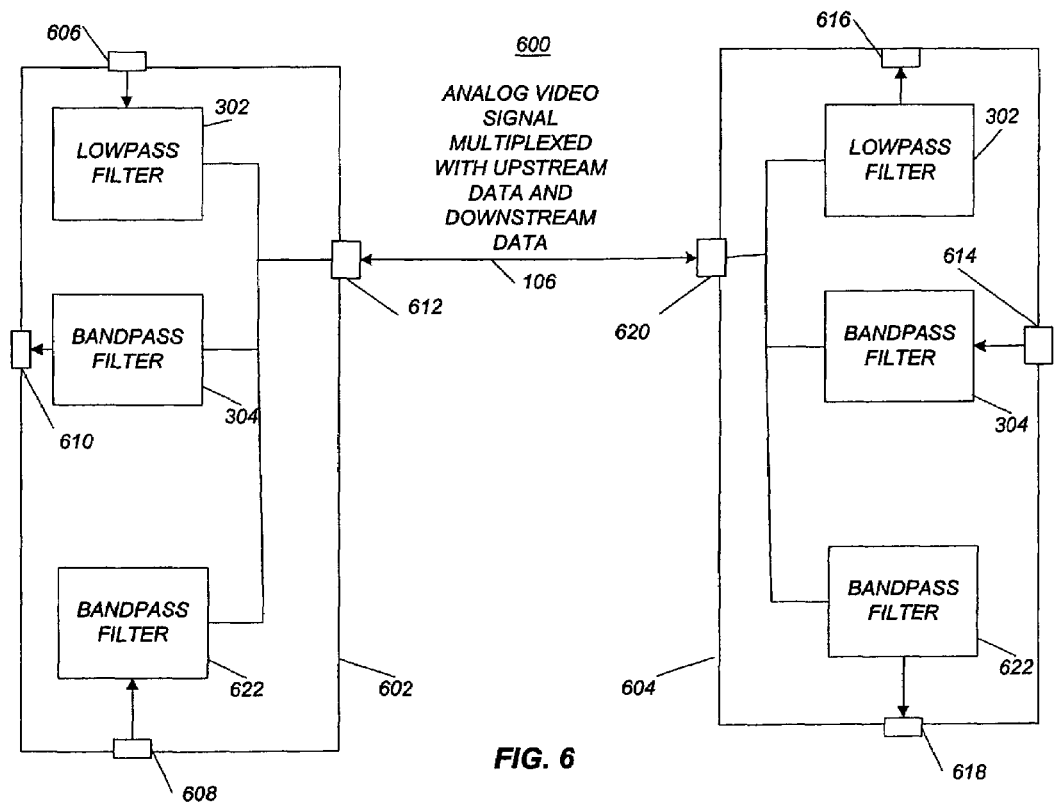
FIG. 6 illustrates block diagram of a bi-directional communications interface for multiplexing an analog video signal with an upstream data signal and a downstream data signal in a video cable.

FIG. 6 illustrates block diagram 600 of a bi-directional communications interface for multiplexing an analog video signal with an upstream data signal and a downstream data signal in a video cable. Shown in FIG. 6 are an analog video cable 106, lowpass filters 302, bandpass filters 304, a source multiplexer 602, a sink multiplexer 604, a first source multiplexer input port 606, a second source multiplexer input port 608, a source multiplexer output port 610, a source multiplexer bi-directional port 612, a sink multiplexer input port 614, a first sink multiplexer output port 616, a second sink multiplexer output port 618, a sink multiplexer bi-directional port 620, and bandpass filters 622.

In FIG. 6, the lowpass filters 302 pass the video signal and block the upstream data signal and the downstream data signal at the first source multiplexer input port and the first sink multiplexer output port.

The bandpass filters 304 have a bandpass selected to pass the upstream data signal while blocking the video signal and the downstream data signal at the source multiplexer output port and the sink multiplexer input port.

The bandpass filters 622 have a bandpass selected to pass the downstream data signal and block the video signal and the upstream data signal at the second source multiplexer input port and the second sink multiplexer output port. The downstream data signal may be generated in a frequency band within the available frequency bandwidth of the analog video cable that lies outside the frequency bands used by the analog video signal and the upstream data signal.

Instead of the lowpass/bandpass/bandpass triple filter combination, two of the bi-directional communications interfaces of FIG. 2 may be used in applications where multiple video cables are used between the video source and the video sink. For example, in some video systems, separate coaxial cables are used to carry the luminance signal Y and the color component signals B-Y and R-Y between the video source and the video sink. The cables that carry these analog video signals are referred to as the Y, PB, and PR cables, respectively. Because the color component signals typically use only half the bandwidth used by the luminance signal, the PB cable may be used with the communications interface of FIG. 2 to carry either the upstream or the downstream data signal, while the PR cable may be used with an identical communications interface in a reversed configuration to carry the other data signal in the opposite direction.

The upstream data signal may be used, for example, to pre-empt an on-screen display in response to a user command from a remote control device. A television monitor typically includes an on-screen display that may be displayed in response to a user command from a handheld remote control for adjusting various parameters such as color, brightness, contrast, and so on. Similarly, a set top box typically includes an on-screen display for selecting various functions performed by the set top box. If both on-screen displays are selected, however, they may both be displayed at the same time. Overlaying the on-screen displays may render them difficult to read, or possibly unreadable. To avoid the problem of overlaying the on-screen displays, the set top box may preempt the television monitor on-screen display, for example, in response to the most recent user command received at the television monitor from a remote control device and sent to the set top box via the upstream data signal.

Figure 7:
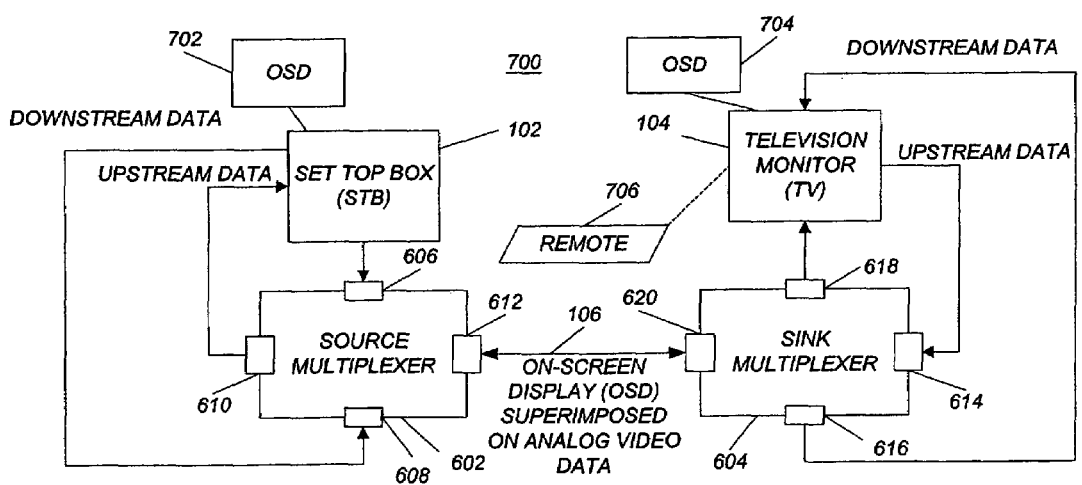
FIG. 7 illustrates a block diagram of the bi-directional communications interface of FIG. 6 in which a set top box on-screen display preempts a television monitor on-screen display in response to a user command received by the television monitor.

FIG. 7 illustrates a block diagram 700 of the bi-directional communications interface of FIG. 6 in which a set top box on-screen display preempts a television monitor on-screen display in response to a user command received by the television monitor. Shown in FIG. 7 are a set top box 102, a television monitor 104, an analog video cable 106, a source multiplexer 602, a sink multiplexer 604, a first source multiplexer input port 606, a second source multiplexer input port 608, a source multiplexer output port 610, a source multiplexer bi-directional port 612, a sink multiplexer input port 614, a first sink multiplexer output port 616, a second sink multiplexer output port 618, a sink multiplexer bi-directional port 620, a set top box on-screen display 702, a television monitor on-screen display 704, and a remote control device 706.

In the example of FIG. 7, user commands received from the remote control device 706 at the television monitor 104 may be transmitted in the upstream data to the set top box 102. The set top box then determines from the user command from the remote control device 706 whether to generate the on-screen display 702 and to include the on-screen display 702 in the analog video signal to the television monitor 104, typically by superimposing or alpha-blending the on-screen display 702 in the analog video signal according to well-known techniques. For example, if the television monitor on-screen display 704 is being displayed when a remote command is received that generates the set top box on-screen display 702, then the set top box on-screen display 702 may preempt the television monitor on-screen display 704 so that the set top box on-screen display 702 is displayed without the television monitor on-screen display 704 being displayed. Conversely, if the set top box on-screen display 702 is being displayed when a remote command is received that generates the television monitor on-screen display 704, then the television monitor on-screen display 704 may preempt the set top box on-screen display 702. In this manner, each remote command that generates a current on-screen display from the video source or the video sink may preempt the previous on-screen display to avoid the problem of overlaying multiple on-screen displays on one other.

Figure 8:
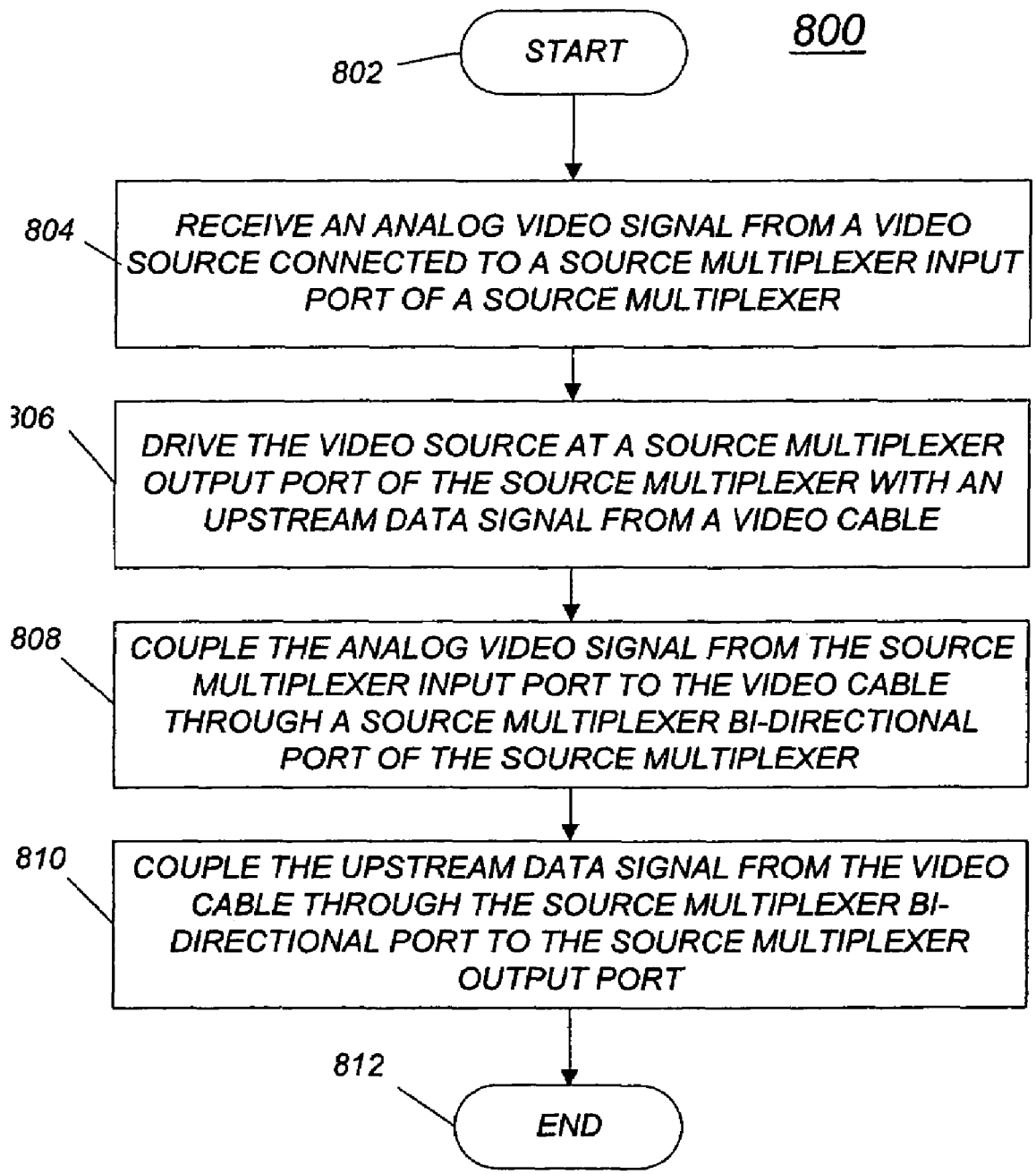
FIG. 8 illustrates a flow chart of a method of multiplexing an analog video signal with an upstream data signal in a video cable.

FIG. 8 illustrates a flow chart 800 of a method of multiplexing an analog video signal with an upstream data signal in a video cable.

Step 802 is the entry point of the flow chart 800.

In step 804, an analog video signal is received from a video source connected to a source multiplexer input port of a source multiplexer. The video source may be, for example, a set top box.

In step 806, the video source is driven at a source multiplexer output port of the source multiplexer with an upstream data signal from a video cable. The upstream data signal may be frequency multiplexed with the analog video signal, and it may also be time multiplexed with the analog video signal during the vertical blanking interval and the horizontal blanking interval of the analog video signal according to well known techniques.

In step 808, the analog video signal is coupled from the source multiplexer input port to the video cable through a source multiplexer bi-directional port of the source multiplexer, for example, by a lowpass filter.

In step 810, the upstream data signal is coupled from the video cable through the source multiplexer bi-directional port to the source multiplexer output port, for example, by a bandpass filter having a frequency range that lies outside the cutoff frequency of the lowpass filter. In this manner, the analog video signal and the upstream data signal are multiplexed in the analog video cable in opposite directions.

Step 812 is the exit point of the flow chart 800.

Figure 9A:
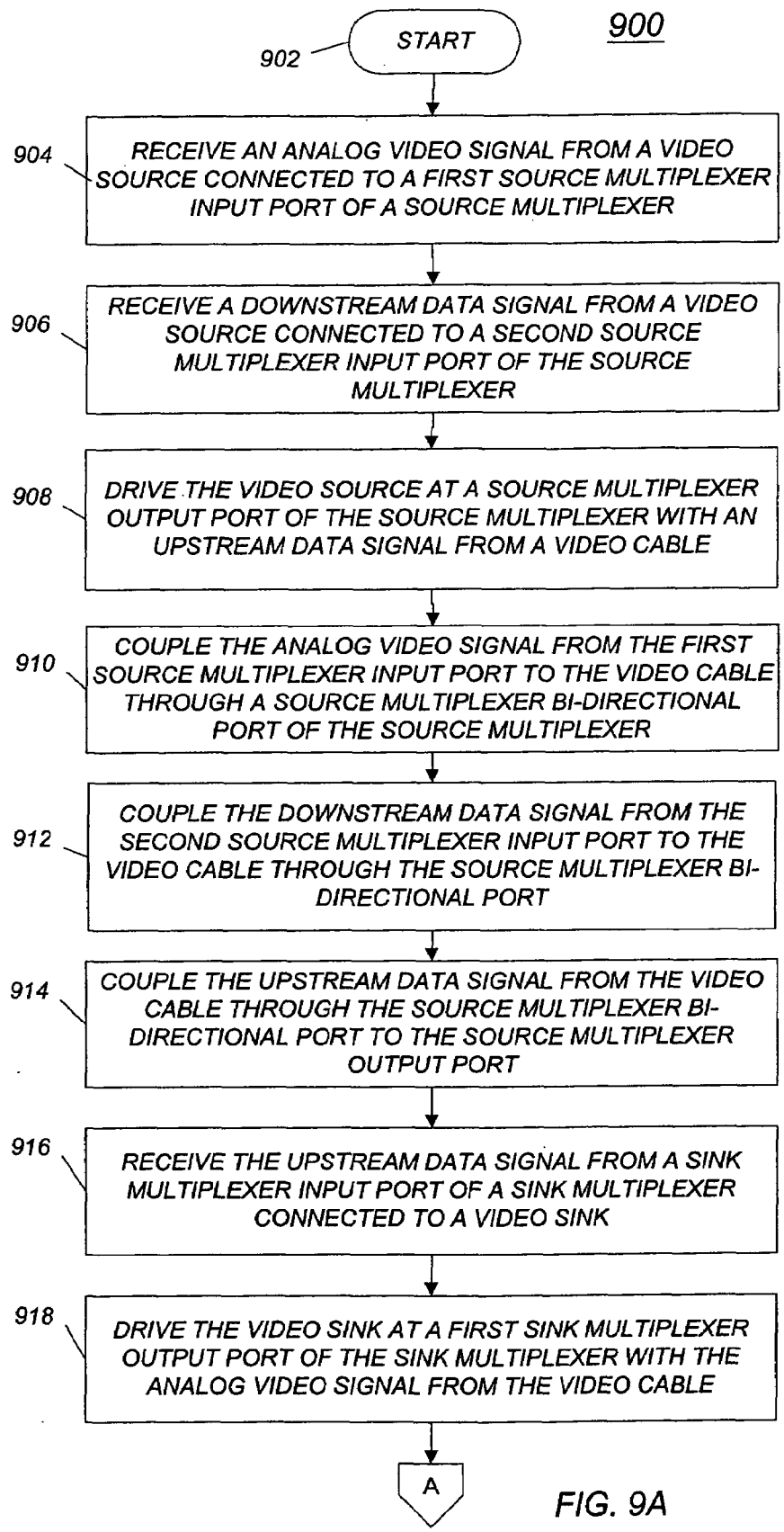
FIGS. 9A and 9B illustrate a flow chart of a method of multiplexing an analog video signal with an upstream data signal and a downstream data signal in a video cable.
Figure 9B:
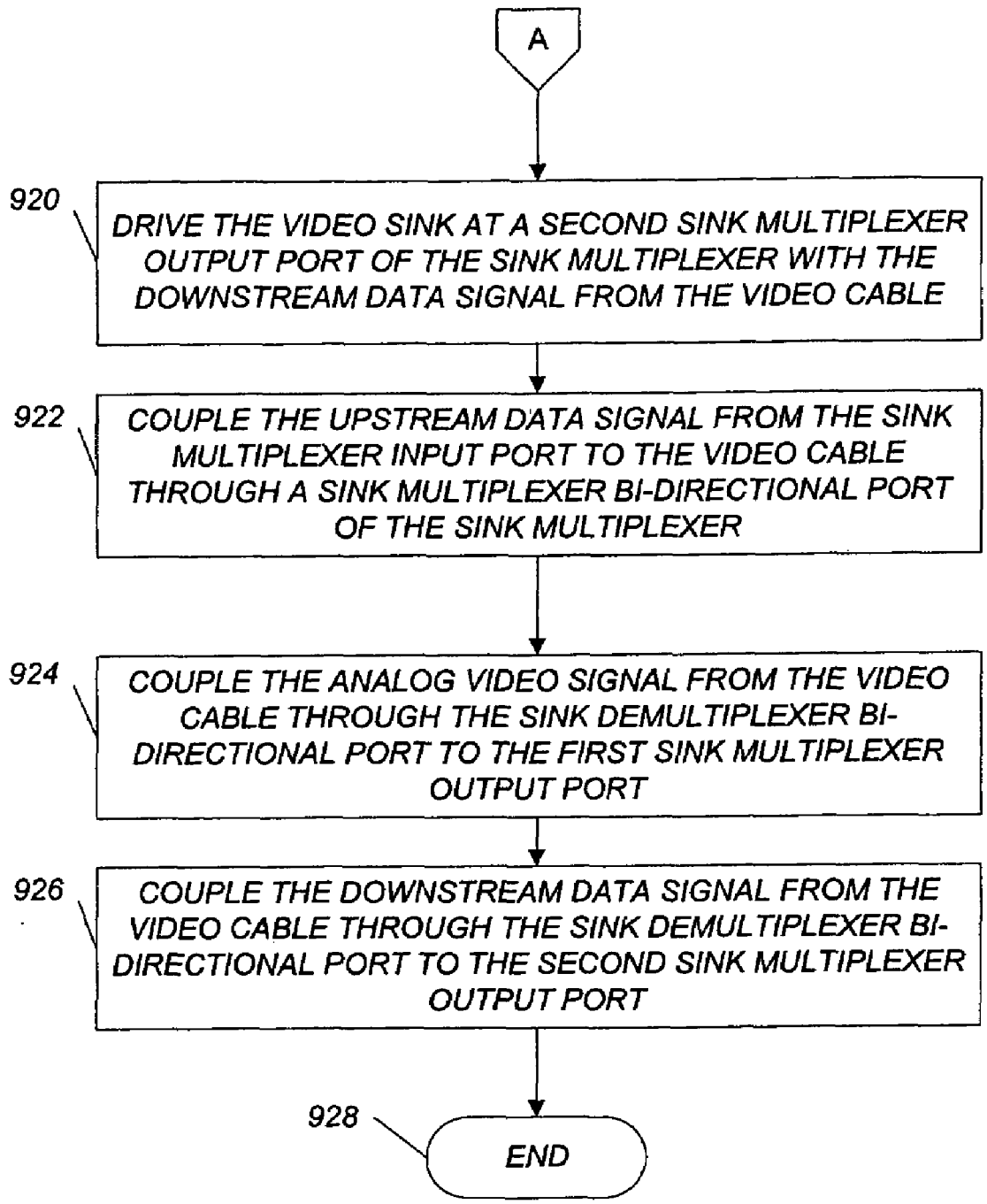

FIGS. 9A and 9B illustrate a flow chart 900 of a method of multiplexing an analog video signal with an upstream data signal and a downstream data signal in a video cable.

Step 902 is the entry point of the flow chart 900.

In step 904, an analog video signal is received from a video source connected to a first source multiplexer input port of a source multiplexer.

In step 906, a downstream data signal is received from a video source connected to a second source multiplexer input port of the source multiplexer.

In step 908, the video source is driven at a source multiplexer output port of the source multiplexer with an upstream data signal from a video cable. The upstream data signal and the downstream data signal may be frequency multiplexed with the analog video signal, and they may also be time multiplexed with the analog video signal during the vertical blanking interval and the horizontal blanking interval of the analog video signal.

In step 910, the analog video signal is coupled from the first source multiplexer input port to the video cable through a source multiplexer bi-directional port of the source multiplexer.

In step 912, the downstream data signal is coupled from the second source multiplexer input port to the video cable through the source multiplexer bi-directional port.

In step 914, the upstream data signal is coupled from the video cable through the source multiplexer bi-directional port to the source multiplexer output port. The analog video signal and the downstream data signal are multiplexed in the video cable with the upstream data signal in opposite directions.

In step 916, the upstream data signal is received from a sink multiplexer input port of a sink multiplexer connected to a video sink. The video sink may be, for example, a television monitor.

In step 918, the video sink is driven at a first sink multiplexer output port of the sink multiplexer with the analog video signal from the video cable.

In step 920, the video sink is driven at a second sink multiplexer output port of the sink multiplexer with the downstream data signal from the video cable.

In step 922, the upstream data signal is coupled from the sink multiplexer input port to the video cable through a sink multiplexer bi-directional port of the sink multiplexer.

In step 924, the analog video signal is coupled from the video cable through the sink demultiplexer bi-directional port to the first sink multiplexer output port.

In step 926, the downstream data signal is coupled from the video cable through the sink demultiplexer bi-directional port to the second sink multiplexer output port.

Step 928 is the exit point of the flow chart 900.

Although the flowchart descriptions above are described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The specific embodiments and applications thereof described above are for illustrative purposes only and do not preclude modifications and variations that may be made within the scope of the following claims.

What is claimed is:

1. An apparatus comprising:
  a source multiplexer for connecting to a video source wherein the source multiplexer comprises:
    a source multiplexer input port for receiving an analog video signal from the video source;
    a source multiplexer output port for driving the video source with an upstream data signal; and
    a source multiplexer bi-directional port for coupling the analog video signal from the source multiplexer input port to a video cable and for coupling the upstream data signal from the video cable to the source multiplexer output port;
    a lowpass filter for passing the analog video signal and blocking the upstream data signal at the source multiplexer input port; and
    a bandpass filter for blocking the analog video signal and passing the upstream data signal at the source multiplexer output port; and
  a sink multiplexer for connecting to a video sink wherein the sink multiplexer comprises:
    a sink multiplexer input port for receiving the upstream data signal from the video sink;
    a sink multiplexer output port for driving the video sink with the analog video signal; and
    a sink multiplexer bi-directional port for coupling the upstream data signal from the sink multiplexer input port to the video cable and for coupling the analog video signal from the video cable to the sink multiplexer output port.

2. The apparatus of claim 1 wherein the source multiplexer comprises a diplexer.

3. The apparatus of claim 1 wherein the analog video signal and the upstream data signal are frequency multiplexed in the video cable.

4. The apparatus of claim 3 wherein the source multiplexer input port and the sink multiplexer output port each comprise a lowpass filter for passing the video signal and blocking the upstream data signal, and the source multiplexer output port and the sink multiplexer input port each comprise a bandpass filter for blocking the video signal and passing the upstream data signal.

5. The apparatus of claim 3 wherein the source multiplexer and the sink multiplexer each comprise a diplexer.

6. The apparatus of claim 1 wherein the analog video signal and the upstream data signal are time multiplexed in the video cable.

7. The apparatus of claim 6 wherein the upstream data signal is transmitted through the video cable during a vertical blanking interval or a horizontal blanking interval of the analog video signal.

8. A method comprising steps of:
  receiving an analog video signal from a video source connected to a source multiplexer input port of a source multiplexer;
  driving the video source by a source multiplexer output port of the source multiplexer with an upstream data signal from a video cable;
  coupling the analog video signal from the source multiplexer input port to the video cable through a source multiplexer bi-directional port of the source multiplexer; and coupling the upstream data signal from the video cable through the source multiplexer bi-directional port to the source multiplexer output port;

passing the analog video signal and blocking the upstream data signal at the source multiplexer input port by a lowpass filter;

blocking the analog video signal and passing the upstream data signal at the source multiplexer output port with a bandpass filter;

receiving the upstream data signal from a sink multiplexer input port of a sink multiplexer connected to a video sink;

driving the video sink at a sink multiplexer output port of the sink multiplexer with the analog video signal from the video cable;

coupling the upstream data signal from the sink multiplexer input port to the video cable through a sink multiplexer bi-directional port of the sink multiplexer; and coupling the analog video signal from the video cable through the sink demultiplexer bi-directional port to the sink multiplexer output port.

9. The method of claim 8 further comprising a step of frequency multiplexing the video signal and the upstream data signal in the video cable.

10. The method of claim 9 further comprising a step of frequency multiplexing the analog video signal and the upstream data signal in the video cable.

11. The method of claim 9 further comprising steps of:
passing the video signal and blocking the upstream data signal at the source multiplexer input port and the sink multiplexer output port; and
blocking the video signal and passing the upstream data signal at the source multiplexer output port and the sink multiplexer input port.

12. The method of claim 11 further comprising a step of time multiplexing the video signal and the upstream data signal in the video cable.

13. The method of claim 12 further comprising a step of transmitting the upstream data signal through the video cable during a vertical blanking interval or a horizontal blanking interval of the analog video signal.

14. An apparatus comprising:
a source multiplexer for connecting to a video source wherein the source multiplexer comprises:
a first source multiplexer input port for receiving an analog video signal from the video source;
a second source multiplexer input port for receiving a downstream data signal from the video source;
a source multiplexer output port for driving the video source with an upstream data signal from a video cable; and
a source multiplexer bi-directional port for coupling the analog video signal from the first source multiplexer input port to the video cable, for coupling the downstream data signal from the second source multiplexer input port to the video cable, and for coupling the upstream data signal from the video cable to the source multiplexer output port; and
a sink multiplexer for connecting to a video sink wherein the sink multiplexer comprises:
a sink multiplexer input port for receiving the upstream data signal from the video sink;
a first sink multiplexer output port for driving the video sink with the analog video signal;
a second sink multiplexer output port for driving the video sink with the downstream data signal; and
a sink multiplexer bi-directional port for coupling the upstream data signal from the sink multiplexer input port to the video cable, for coupling the analog video signal from the video cable to the first sink multiplexer output port, and for coupling the downstream data signal from the video cable to the second sink multiplexer output port;
wherein the analog video signal is frequency multiplexed in the video cable with the upstream data signal and the downstream data signal; and
wherein the first source multiplexer input port and the first sink multiplexer output port each comprise a lowpass filter for passing the video signal and blocking the upstream data signal and the downstream data signal, and wherein the first source multiplexer output port, the second source multiplexer input port, the sink multiplexer input port, and the second sink multiplexer output port each comprise a bandpass filter for blocking the video signal and passing the upstream data signal and the downstream data signal.

15. The apparatus of claim 14 wherein the source multiplexer and the sink multiplexer each comprise a triplexer.

16. The apparatus of claim 14 wherein the video source is a set top box and the video sink is a television monitor.

17. The apparatus of claim 16 wherein the upstream data signal includes a user command received by the television monitor from a remote control.

18. The apparatus of claim 17 wherein the downstream data signal includes on-screen display information for only one of the set top box and the television monitor in response to the user command.

19. A method comprising steps of:
receiving an analog video signal from a video source connected to a first source multiplexer input port of a source multiplexer;
receiving a downstream data signal from a video source connected to a second source multiplexer input port of the source multiplexer;
driving the video source by a source multiplexer output port of the source multiplexer with an upstream data signal from a video cable;
coupling the analog video signal from the first source multiplexer input port to the video cable through a source multiplexer bi-directional port of the source multiplexer;
coupling the downstream data signal from the second source multiplexer input port to the video cable through the source multiplexer bi-directional port;
coupling the upstream data signal from the video cable through the source multiplexer bi-directional port to the source multiplexer output port;
receiving the upstream data signal from a sink multiplexer input port of a sink multiplexer connected to a video sink;
driving the video sink at a first sink multiplexer output port of the sink multiplexer with the analog video signal from the video cable;
driving the video sink at a second sink multiplexer output port of the sink multiplexer with the downstream data signal from the video cable;
coupling the upstream data signal from the sink multiplexer input port to the video cable through a sink multiplexer bi-directional port of the sink multiplexer;
coupling the analog video signal from the video cable through the sink demultiplexer bi-directional port to the first sink multiplexer output port; and coupling the downstream data signal from the video cable through the sink demultiplexer bi-directional port to the second sink multiplexer output port;

passing the analog video signal and blocking the upstream data signal and the downstream data signal at the source multiplexer input port and the first sink multiplexer of the output port by a lowpass filter;

passing the upstream data signal and blocking the video signal and the downstream data signal at the source multiplexer output port and the sink multiplexer input port by a bandpass filter; and passing the downstream data signal and blocking the video signal and the upstream data signal at the second source multiplexer input port and the second sink multiplexer output port by a bandpass filter.

20. The method of claim 19 further comprising a step of frequency multiplexing the video signal in the video cable with the upstream data signal and the downstream data signal.

21. The method of claim 19 wherein the video sink is a set top box and the video sink is a television monitor.

22. The method of claim 21 further comprising a step of including a user command received by the television monitor from a remote control in the upstream data signal.

23. The method of claim 22 further comprising a step of including on-screen display information in the downstream data signal for only one of the set top box and the television monitor in response to the user command.

24. The method of claim 21 further comprising a step of pre-empting a previous on-screen display with a current on-screen display from a video source or a video sink in response to a remote command to avoid overlaying multiple on-screen displays on one another.

* * * * *